Feb. 18, 1947.   C. W. SCHREIBER ET AL   2,416,121
BURN-OFF MACHINE
Filed Feb. 3, 1943   12 Sheets-Sheet 1

Fig. 1.

INVENTORS
C. W. Schreiber and
K. B. Vollstorf,
BY Peile and Hoge,
ATTORNEYS

Feb. 18, 1947.   C. W. SCHREIBER ET AL   2,416,121
BURN-OFF MACHINE
Filed Feb. 3, 1943   12 Sheets-Sheet 7

INVENTORS
C. W. Schreiber and
K. B. Vollstorf,
BY
ATTORNEYS

Patented Feb. 18, 1947

2,416,121

UNITED STATES PATENT OFFICE 2,416,121

BURN-OFF MACHINE

Carl W. Schreiber and Karl B. Vollstorf, Toledo, Ohio, assignors, by mesne assignments, to Owens-Illinois Glass Company, Toledo, Ohio, a corporation of Ohio Application February 3, 1943, Serial No. 474,560

19 Claims. (Cl. 49—50)

Our invention relates to the manufacture of glassware such as tumblers, jars, bottles, and other blown articles, and particularly to mechanism for severing from the articles by a burn-off operation, the moile or waste portions of glass by which the articles are attached to the blow pipes or spindles.

An object of our invention is to provide a machine which is entirely automatic in operation and adapted for receiving the articles in rapid succession, severing the moile by a burn-off operation and forming a bead on the rim of the article at the line of severance.

A further object of the invention is to provide various novel features of adjustment adapting the burn-off machine for use with a variety of ware throughout a wide range in length and other dimensions.

A further feature of the invention relates to novel means for controlling the formation and varying the size of the bead formed on the rim of the article during the finishing operation.

A further object of our invention is to provide a burn-off machine in which the workpieces are supported in an upright position, in combination with novel means for gripping the moile and for applying a stretching operation concurrently with the application of localized flame for severing the moile.

A further object of the invention is to provide means by which a flame of intense heat may be applied by the burners, which may be supplied, for example, by a mixture of fuel gas and oxygen, thereby quickly severing the moile, and then maintaining a flame of less intensity during the fire-finishing operation, as by means of a mixture of fuel gas and air, or by means of a fuel mixture of gas and oxygen only reduced for less intensity during the fire-finishing operation. In this manner the temperatures are adapted to both the severing and the finishing operations and the required amount of oxygen reduced, thereby effecting a substantial economy.

A further object of the invention is to provide a machine adapted to receive articles in rapid succession in an upright position, and maintain them in such position throughout the burn-off operations and the discharge of the finished articles from the machine.

A further object of the invention is to provide a machine comprising a multiplicity of burn-off units arranged in an annular series on a rotating carriage, and valve mechanisms rotating with the carriage, and each adapted to control the supply of fuel gases and combustion supporting gases to a plurality of said units.

Other objects of the invention will appear hereinafter.

Referring to the accompanying drawings which illustrate a burn-off machine embodying our invention.

Figure 1:
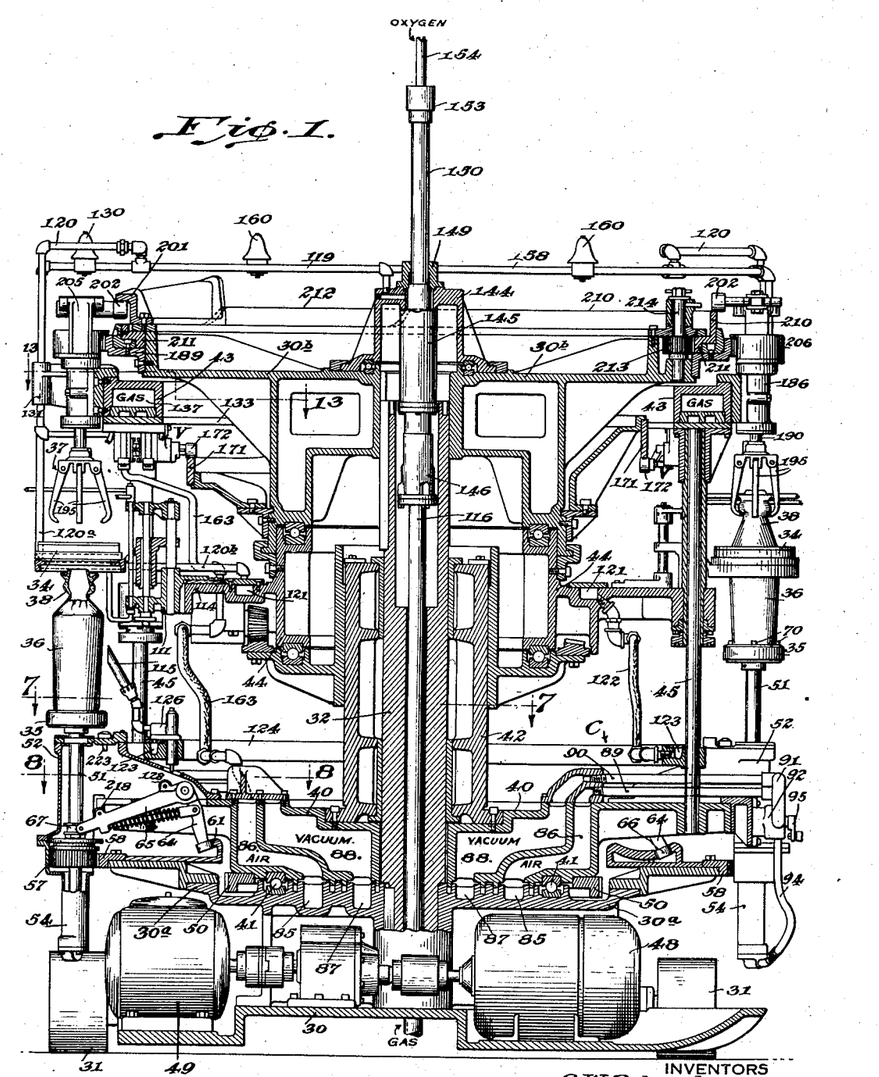
Fig. 1 is a central sectional elevation of the machine.

Referring particularly to Fig. 1, the machine comprises a stationary framework including a base 30 mounted on wheels 31, a vertical center column 32 fixed to the base, a lower spider or casting 30a mounted on the base, and an upper spider or casting 30b keyed to the center column 32. A framework or carriage C mounted to rotate about the axis of the center column, provides a support for an annular series of burn-off units. Each said unit comprises a ring burner 34, a bottom plate 35 for supporting a workpiece 36, such as a glass tumbler, a gripping device 37 comprising a set of jaws for gripping the moile 38, means for lifting the bottom plate 35 with a workpiece thereon, to project the latter to the burn-off position within the burner, means for actuating the gripping jaws, means for applying suction through the bottom plate 35 for holding the workpiece, means for moving the gripping device upwardly for applying an upward pull to the moile during the burn-off operation, and various other mechanisms as hereinafter set forth.

The carriage comprises a lower table or casting 40 supported on the machine base and running on ball bearings 41, a drum 42 bolted to the casting 40, an annular upper section 43 and an intermediate section or casting 44. Vertical tie rods 45 connect the parts 40, 44, and 43. The carriage is rotated continuously by means of an electric motor 48 operating through speed reduction gearing within a gear case 49, said gearing having a driving connection through intermediate gearing with a ring gear 50 on the casting 40. Such intermediate gearing may be conventional, as for example, that shown and described in the United States patent to Bock, No. 870,664, November 12, 1907, Machine for gathering and shaping glass.

Each bottom plate 35 (see Figs. 1, 3, and 7 to 12) is carried on the upper end of a vertical tubular spindle 51 mounted for rotation within a housing comprising an upper section 52 consisting of a casting secured by bolts 53 to the carriage 40, and a lower tubular section 54 secured by bolts 55 to the section 52. The spindle 51 is journalled for rotation in bearings in a cap plate 56 bolted to the casting 52. The spindle is rotated by means including a pinion 57 journalled in the upper end of the section 54 and rotatable freely on the spindle 51. The pinion runs in mesh with a ring gear 58 mounted on the machine base. Driving connection is made between the pinion 57 and the spindle when the latter is in its lifted position, through a clutch comprising a clutch member 59 attached to the lower side of the gear and a clutch member 60 secured to the lower end of the spindle.

Means for lifting and lowering the bottom plates 35 comprises a cam track 61 formed on a stationary annular cam plate 62 supported on the machine base. The cam operates through a bell crank comprising arms 64 and 65 and having a pivot pin 63 mounted in the casing 52. The arm 64 is provided with a cam follower roll 66 which runs on the cam track. The outer end of the arm 65 is bifurcated to straddle a flanged collar 67 fixed to the spindle 51 and providing an operating connection between the spindle and bell crank. The arm 64 can swing independently of the arm 65 and compress a coil spring 65a, when the arm 65 encounters any abnormal resistance. This yieldable connection between the bell crank arms serves a further purpose as will appear hereinafter. When the spindle 51 and bottom plate 35 are lifted to position the workpiece within the burner, the clutch members 59, 60 are engaged and the workpiece thereby rotated during the operation of burning off the moile and fire-finishing the rim of the article.

Figures 9, 10, 11, 12:
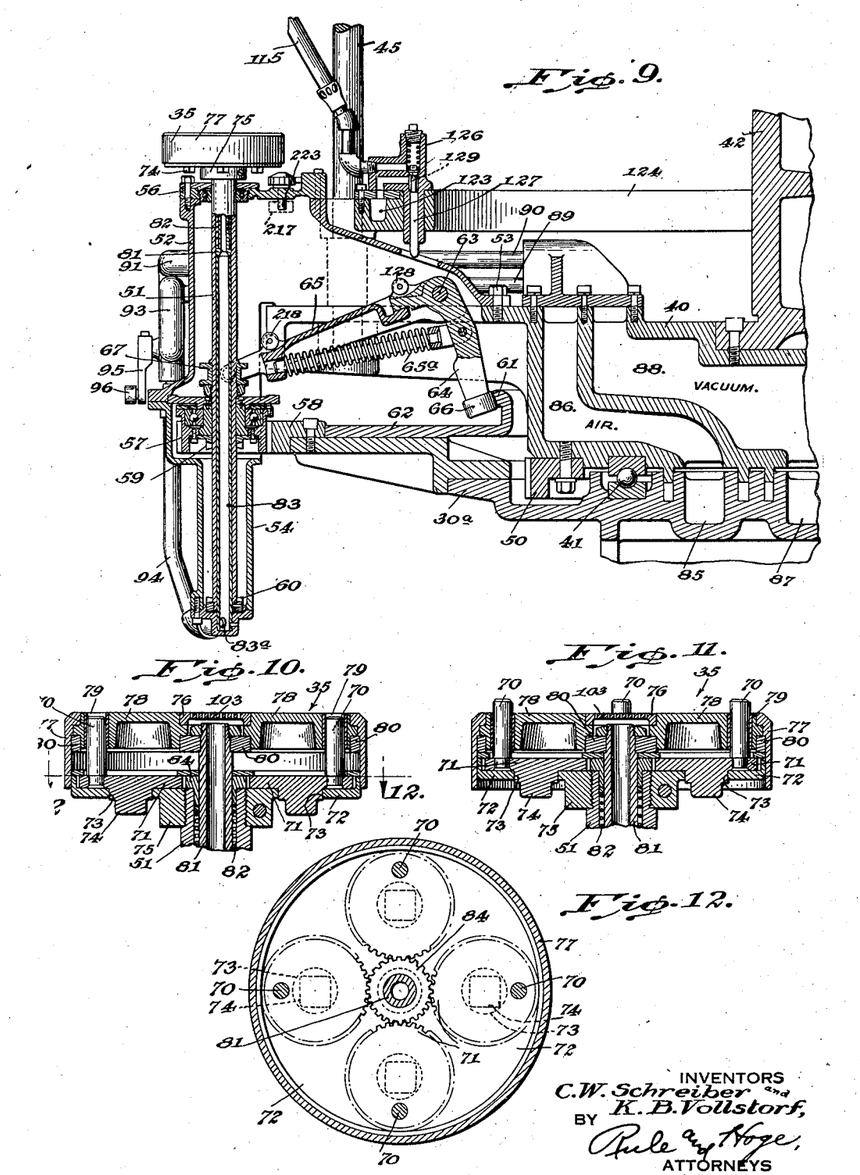
Fig. 9 is a view partly in elevation and partly in section at the line 9—9 on Fig. 7, showing a bottom plate and mechanism for lifting and lowering it and for rotating it when in its lifted position.
Fig. 10 is an enlarged fragmentary sectional elevation of a bottom plate and its carrying spindle and the article centering pins, the latter in their retracted position.
Fig. 11 is a similar view showing said pins projected to operative position.
Fig. 12 is a section at the line 12—12 on Fig. 10, showing particularly the adjusting means by which the centering pins are adjustable to accommodate ware of different diameters.

The workpiece is held in centered position on the bottom plate during the burn-off operation, by means of a set of centering pins 70 which project above the surface of the bottom plate, but which are retracted as shown in Fig. 10, while the bottom plate is in its lowered position to facilitate the placing of the workpieces in position and removing them from the bottom plate.

The bottom plate 35 or support, as a whole, comprises a lower section including a circular plate 72 carrying the pins 70, and an upper section, said sections being relatively movable a short distance up and down for retracting and projecting the centering pins 70. These pins are adjustable toward and from the center of the bottom plate for adapting them to ware of different diameters. For this purpose the pins are eccentrically mounted on adjusting gears 71 which are rotatably supported on the plate 72. Each said gear is formed with a hub 73 journalled in the plate 72 and having a squared end 74 to which an implement may be applied for rotating the gear. The gears 71 mesh with a center pinion 84 so that rotative adjustment of any gear causes a corresponding adjustment of all the gears for moving the centering pins toward or from the center of the bottom plate. The plate 72 is formed with a hub 75 threaded on the upper end of the spindle 51.

The upper section of the support 35 includes a top plate 76 providing a supporting surface for the workpiece and formed with a depending flange or skirt 77 which telescopes with the lower plate 72. The upper section also includes a plate 80 spaced a short distance below the plate 76, and having a fixed mounting within the flange 77. Rotatably mounted in said upper section, are flanged disks 78 concentric with the gears 71 and provided with openings 79 in which the pins 70 are slidable up and down. A tubular stem 81 attached at its upper end to the disk 80, extends downward within the spindle 51. A coil spring 82 is housed in an annular space provided between the stem 81 and the inner wall of the spindle 51. The spring is held under compression with its lower end bearing on a shoulder formed on the lower end of the stem 81 and its upper end bearing against the pinion 84. The spindle 51 has a telescoping connection with an inner tube 83 which is keyed at its lower end to the casing 54 and is formed with a port 83a opening into a pipe 94 hereinafter described.

When the bottom plate 35 is in its lowered position (Fig. 9) the lower end of the stem 81 seats on the upper end of the tube 83 so that the upper section of the bottom plate is held in the Fig. 10 position in which the centering pins 70 are retracted. When the rock arm 65 (Fig. 9) operates to lift the spindle 51, the lower section of the bottom plate is carried upward with the spindle to the Fig. 11 position before the upper section starts its upward movement, thereby projecting the centering pins. The upper section remains stationary during this initial movement, as it is held down by the compression spring 82, its own weight, and that of the workpiece thereon. When the bottom plate is lowered, the stem 81 seats on the tube 83 so that the final movement of the spindle 51 withdraws the centering pins.

The workpieces are held on the bottom plates by means of suction applied through the tubular stems 51. Air under pressure is also supplied periodically through the stems 51 when the bottom plates are empty, for the purpose of blowing off any particles of glass or other foreign material. The air and vacuum system employed for this purpose will now be described.

Referring to Fig. 1, the stationary plate 30a is provided with an air pressure chamber or channel 85 connected to any suitable source of air under pressure. This channel is in continuous communication with an annular air pressure chamber 86 formed in the carriage casting 40. A vacuum chamber or channel 87 which is also formed in the plate 30a and is connected to a suction fan or other means for exhausting the air, communicates with a vacuum chamber 88 in the carriage casting 40. Air and vacuum lines individual to the bottom plates 35, extend from the air and vacuum chambers 86 and 88 respectively, through pipes 89 andd 90 (Figs. 1 and 4) which are arranged radially of the carriage. Each vacuum pipe 90 at its outer end, opens into a U-shaped pipe section 91 (Figs. 3 and 7) which in turn opens into a valve 92. The pressure pipes 89 open at their outer ends into pipe sections 93 leading to the valve 92. Extending downward from each valve 92 is the pipe 94, which at its lower end, opens into the lower end of the tube 83 (Fig. 9).

The valve 92 is operative to connect the pipe 94 either with the suction line or the air pressure line, and is moved to a neutral position for cutting off both air and vacuum. The means for actuating the valve includes the rock arm 95 carrying a roll 96 adapted to be actuated by a series of stationary detents 97, 98, 99, and 100 (Figs. 24 and 25) carried on brackets 101 and 102.

Each plate 76 (Figs. 10 and 11) serves as a suction pad or plate and for this purpose is formed with a multiplicity of perforations 103 extending therethrough and communicating with the interior of the stem 51. The operations of the valve 92 are timed to apply suction to each of the bottom plates after a workpiece has been placed thereon and thereby hold the workpiece during the burn-off operation. The air pressure line is opened after the finished workpiece has been removed and is held open for a short length of time.

Figure 4:
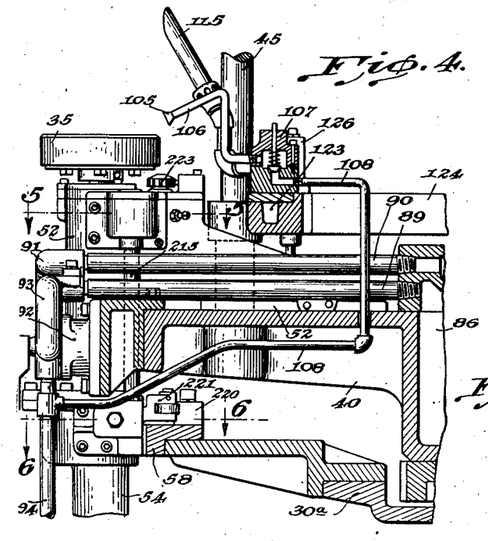
Fig. 4 is a section at the line 4—4 on Fig. 7, showing a bottom plate and associated parts, including means for applying a blast of air for cleaning the plate.
Figure 5:
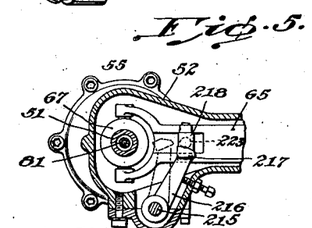
Figs. 5 and 6 are sectional detail views at the lines 5—5 and 6—6 on Fig. 4, showing mechanism by which the bottom plate may be moved upward a short distance for the fire-finishing operation following the severance of the moiles.
Figure 6:
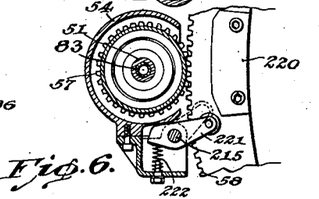
Figure 7:
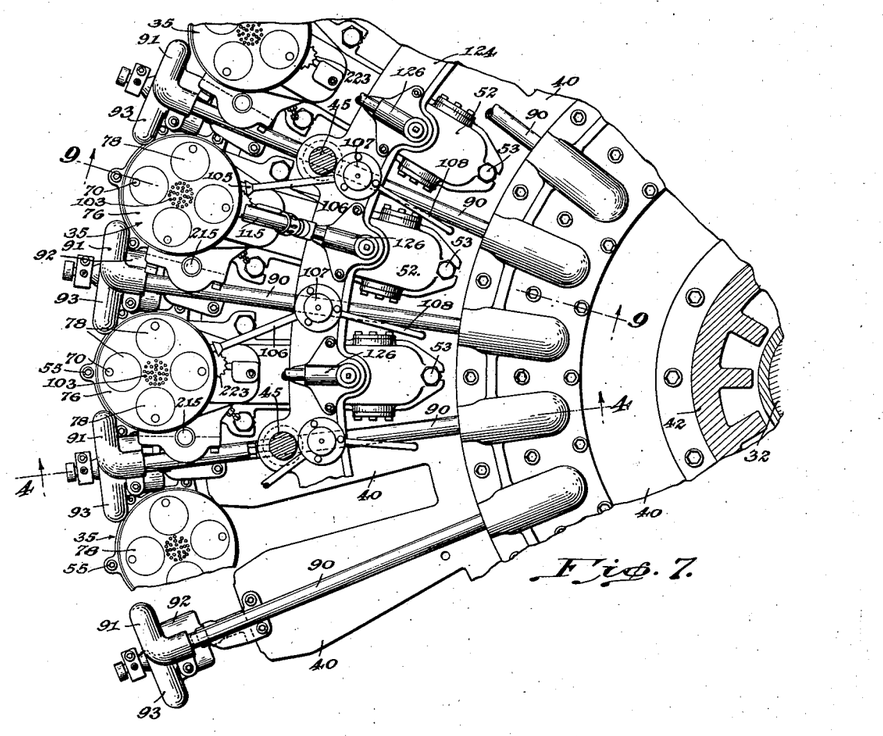
Fig. 7 is an enlarged fragmentary sectional plan at the plane of the line 7—7 on Fig. 1, showing a number of bottom plates and associated parts.
Figure 8:
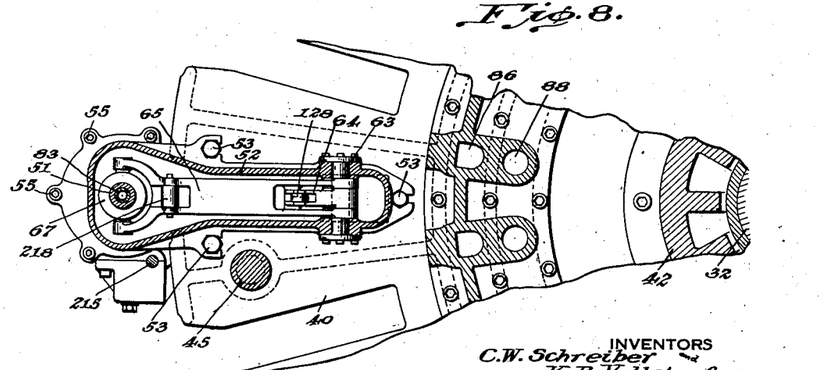
Fig. 8 is an enlarged fragmentary section at the line 8—8 on Fig. 1, showing means for lifting a bottom plate and the housing for such lifting means.

Associated with each bottom plate 35 is a nozzle 105 (Fig. 4) arranged to direct a blast of air over the surface of the plate, thereby supplementing the action of the air blown through the openings 103 for cleaning the bottom plate. As shown in Fig. 4 the blower 105 is connected to the pipe 94 through an air line comprising a pipe 106, a check valve 107, and a pipe 108. The check valve prevents air from being drawn by suction into the pipe 94 when the latter is connected with the suction line.

Each burner 34 (Fig. 15) comprises an annular chamber 109 from which flame is directed against the workpiece for severing the moile. The burner is mounted in a carrier 110 which is supported on a frame 111. The burner is adjustable up and down by means of a screw threaded rod 112 journalled in the frame 111 and rotatable by a knob 113. The frames 111 which carry the burners are mounted on an annular ledge 114 formed on the casting 44. Burners 115 (Figs. 1 and 9) are arranged to direct flames against the bottom plates 35 when the latter are in their lifted position for the burn-off operation.

Figure 2:
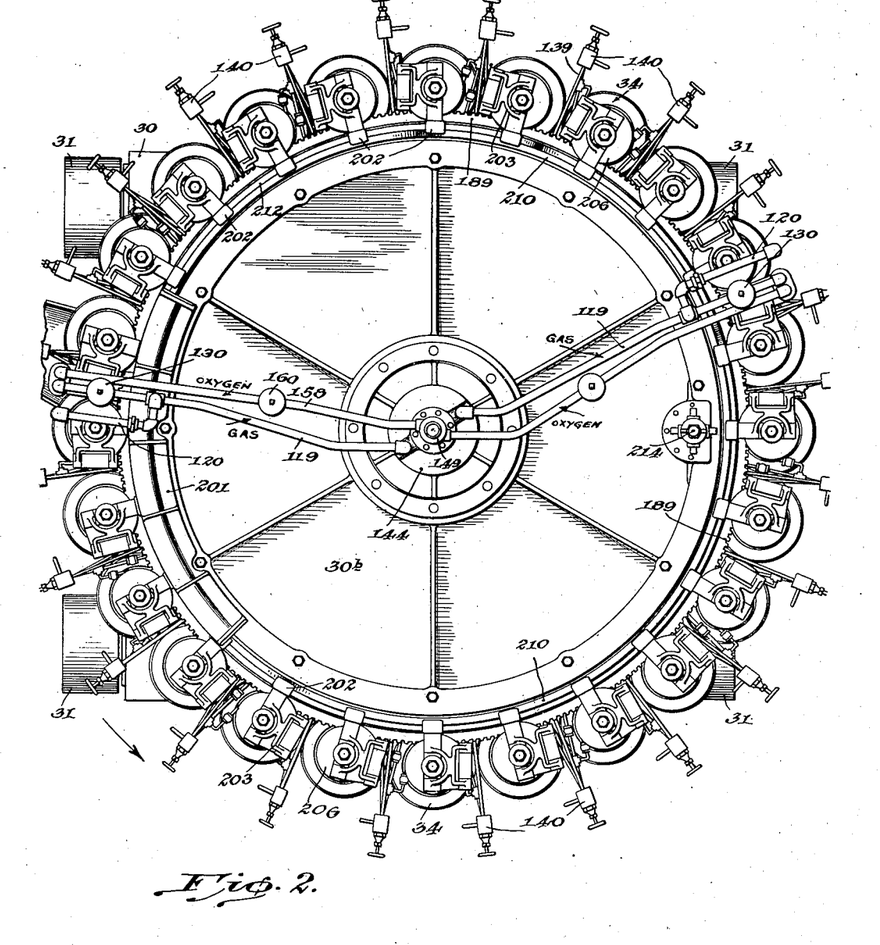
Fig. 2 is a plan view of the machine.
Figure 3:
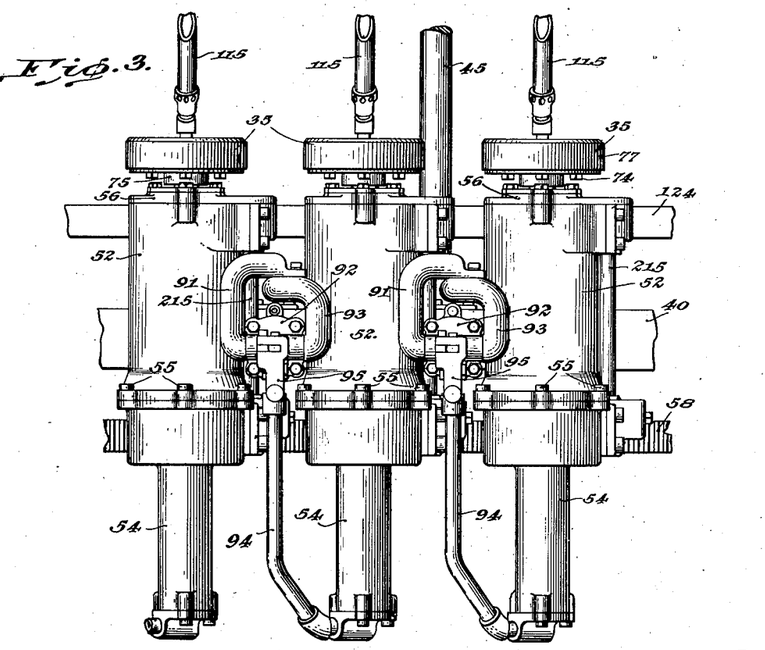
Fig. 3 is a fragmentary view in elevation showing several bottom plates and casings in which the mechanisms for lifting and lowering the plates are mounted.

Fuel gas is supplied to the burners 34 and 115 through a pipe 116 (see Figs. 1 and 21) extending upward within the center column 32 of the machine. The gas line includes an annular passageway 117 extending upward from the pipe 116, lateral channels 118, and pipes 119 (Figs. 1 and 2) extending to opposite sides of the carriage. Branch pipes 120 tap the pipes 119 and each includes a vertical section 120a and a section 120b extending radially inward and opening into an annular channel 121 formed in the casting 44. A pipe 122 (Fig. 1) leads downward from the channel 121 and opens into an annular channel 123 (Figs. 1 and 9) formed in a ring 124, which forms a part of the carriage.

The fuel gas is intermittently supplied from the channel 123 to the burners 115 through valves 126 (Fig. 9) mounted on the ring 124. Each said valve includes a valve stem 127 which is lifted by a roll 128 on the arm 65 when the latter is moved upward to position the workpiece for the burn-off operation. The burners 115 serve to maintain the bottom plates at the desired temperature. When the valve stem 127 is lowered, a restricted flow of gas is permitted through a constricted opening 129, for maintaining a pilot flame.

Fuel gas is continuously supplied to the ring burners 34 through the pipes 119 (Figs. 2 and 21), said pipes being provided with regulators 130. The pipes 119 extend radially outward and thence downward to supporting blocks 131 (Figs. 13 and 14) mounted on the annular casting 43 which forms a part of the carriage. The part 43 is in the form of an inverted channel iron resting on a bottom plate 133. An annular casting or member 134 is mounted within the casting 43 and formed with annular channels 135 and 136 which provide distributing chambers for oxygen and compressed air respectively as hereinafter set forth. The part 43 provides a chamber 137 for the regulated fuel gas which is conducted thereto from the pipe 119 through a channel 138 in the block 131. The fuel gas is conducted from the chamber 137 to the burners 34 through pipe lines individual to the burners, and each including a pipe 139 (Figs. 13, 14, 15, 16), hand valve 140, pipe 141, mixing chamber 142 and pipe 143, the latter opening into the burner chamber 109. During the burn-off and fire-finishing operations the gas is mixed with either air or oxygen which are supplied alternately to the mixing chamber 142, or with air or oxygen mixed separately with gas and supplied as presently described.

Figures 21, 22, 23:
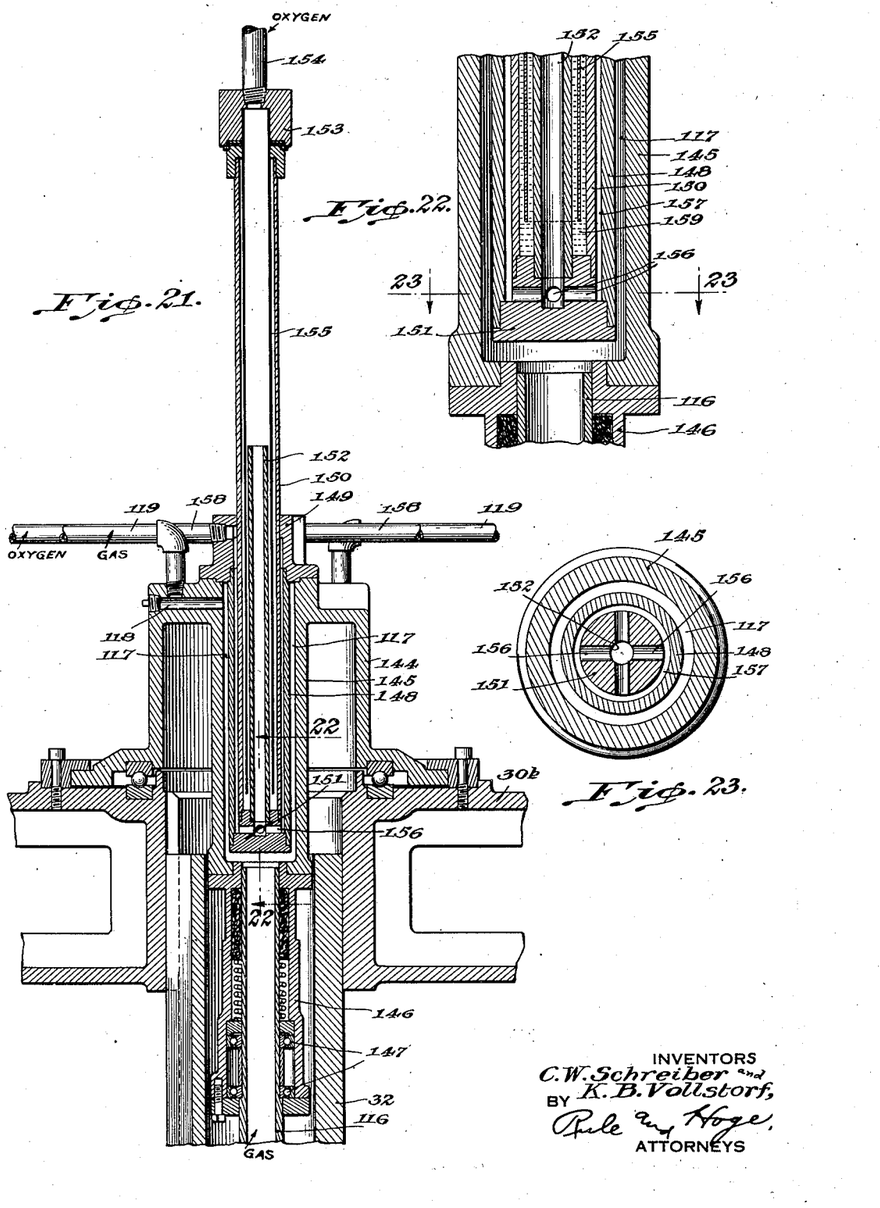
Fig. 21 is a fragmentary sectional elevation showing the upper end portion of the center column of the machine and associated parts.
Fig. 22 is an enlarged section at the line 22—22 on Fig. 21.
Fig. 23 is a section at the line 23—23 on Fig. 22.

Referring to Fig. 21, a drum 144 is mounted on the carriage and provides a support for the pipes 119. The drum is formed with a hub or section 145 extending downwardly therethrough and attached at its lower end to a cylindrical member 146 providing a housing for ball bearings 147 surrounding the stationary pipe 116. A tubular member 148 attached to a head 149 on the drum 144, extends downwardly within the hub 145, being spaced therefrom to provide the channel 117. Mounted within the head 149 is a hollow shaft 150, the lower end of which is closed by a block 151. Within the shaft 150 is a central tubular rod 152 attached to the block 151. The upper end of the shaft 150 has attached thereto, a connector block 153, to which is also attached a supply pipe 154 through which oxygen is supplied for the burners. A tube 155 extends downward from the block 153 into the annular space provided between the inner wall of the pipe 150 and the outer wall of the rod 152.

The oxygen passes downward through tubes 155 and 152 to the block 151 which is formed with lateral ports 156 (see Fig. 23) opening into the annular space 157 between the tubes 150 and 148 and upwardly to the pipes 158. A mercury seal 159 (Fig. 22) is provided between the tubes 152 and 155. Oxygen regulators 160 are provided in the pipes 158. The pipes 158 extend radially to the periphery of the carriage and thence downwardly to the blocks 131 (Fig. 14) and open into channels 161 which extend through the said blocks and communicate through pipes 162 with the oxygen distributing chamber 135.

Air under pressure is transmitted from the air chamber 86 (Fig. 1) upwardly through a pipe line 163 (Figs. 1 and 14) to the compressed air channel 136.

Figures 13, 14:
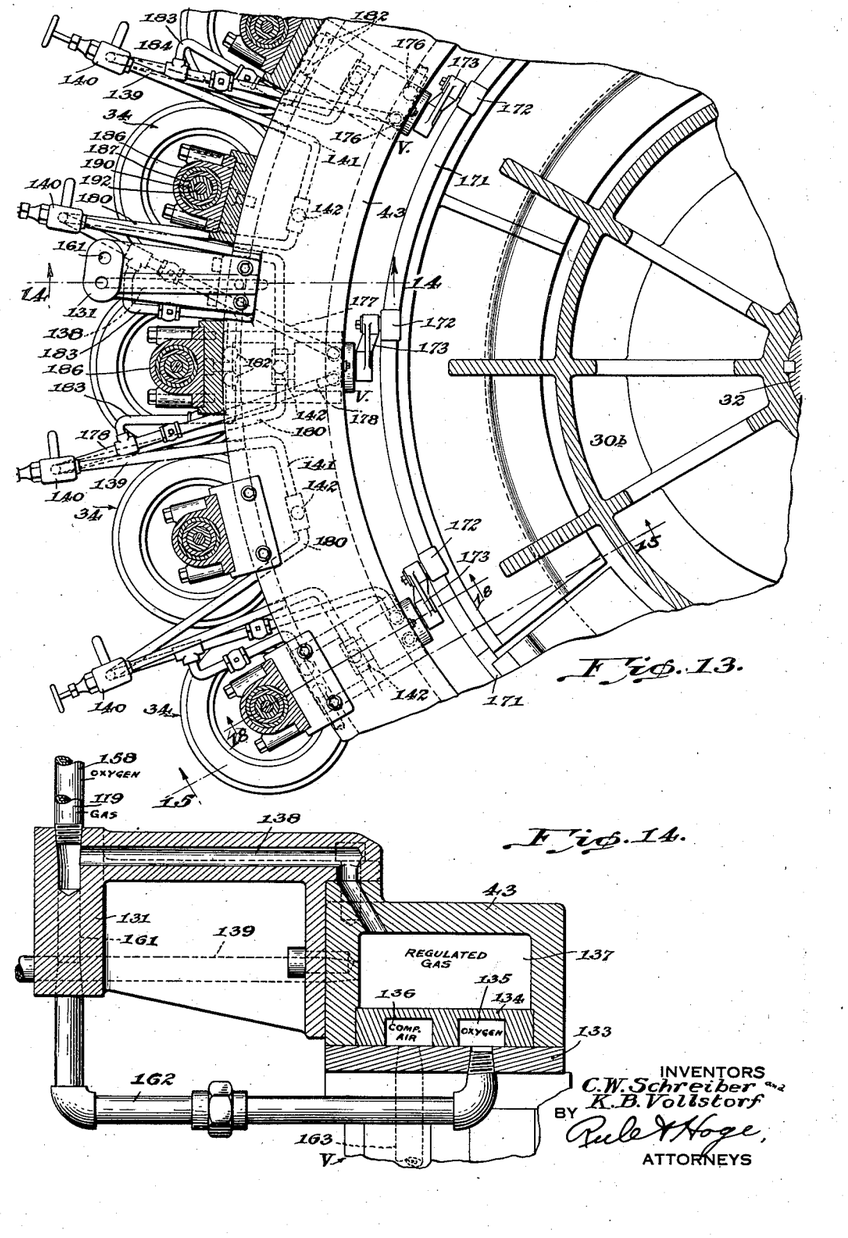
Fig. 13 is an enlarged fragmentary section at the line 13—13 on Fig. 1, showing in section the spindle mechanism for the moile gripping jaws and also showing a portion of the piping system for distributing fuel gas, oxygen and air to the burners.
Fig. 14 is a section at the line 14—14 on Fig. 13.

Valve mechanisms V (see Figs. 15 and 18 to 20) are provided to control the supply of air and oxygen to the ring burners so that compressed air and oxygen are supplied alternatively and mixed with the fuel gas, while at times, both the air and oxygen supply are cut off. As indicated in Fig. 13, one such valve mechanism is provided for each two burner units. Each valve mechanism includes valve casings 164 and 165 providing valve chambers 166 and 167. Within the valve chamber 167 is a valve disk 168 connected to a rock shaft 169. A valve disk 170 within the valve chamber 166, also is operatively connected to the rock shaft 169. Means for rocking the valve shaft includes a stationary cam track 171 (Figs. 1 and 15) on which runs a cam follower roll 172, mounted on a crank 173 on the shaft 169.

Figure 15:
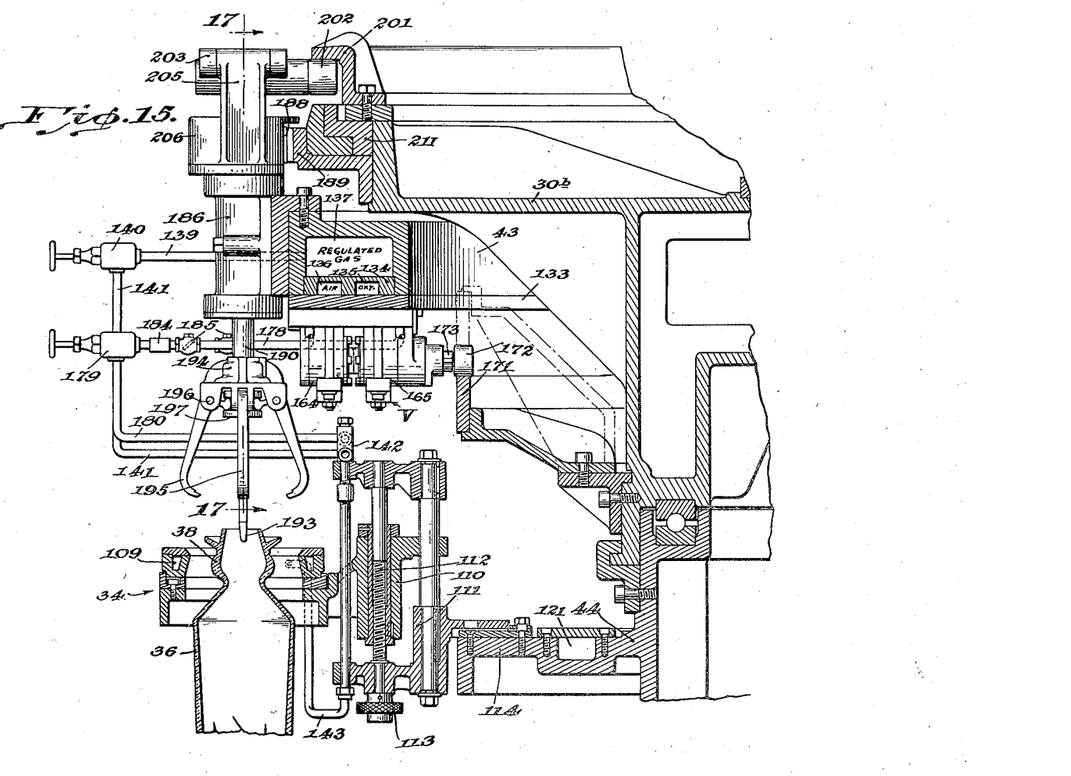
Fig. 15 is a section at the line 15—15 on Fig. 13.
Figure 16:
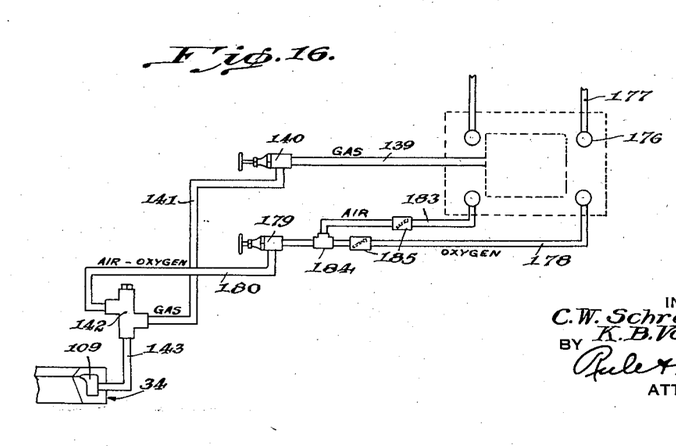
Fig. 16 is a diagram of the air, fuel gas and oxygen lines for a burner.

The oxygen chamber 135 is open to the valve chamber 167 through a port 174. The valve disk 168 is formed with port openings 175 which are adapted to be brought into register with channels 176 which extend through the valve casing and open into a pair of horizontally disposed pipes 177 and 178 which extend outwardly in divergent directions as shown in Fig. 13. Each of the pipes 177 and 178 is connected at its outer end to a hand valve 179 (Figs. 15, 16). The oxygen lines are continued from the valves 179 through pipes 180 to the mixing chambers 142.

Air pressure lines extend from each valve chamber 166 (Fig. 18) and are connected to the oxygen lines at points intermediate the valve chamber and the mixing chambers 142. These air pressure lines include openings 181 (Fig. 20) through the valve disk 170, channels 182 extending through the valve casings, and pipes 183 (Figs. 13, 16) which are connected at 184 to the oxygen lines.

Figures 17, 18, 19, 20:
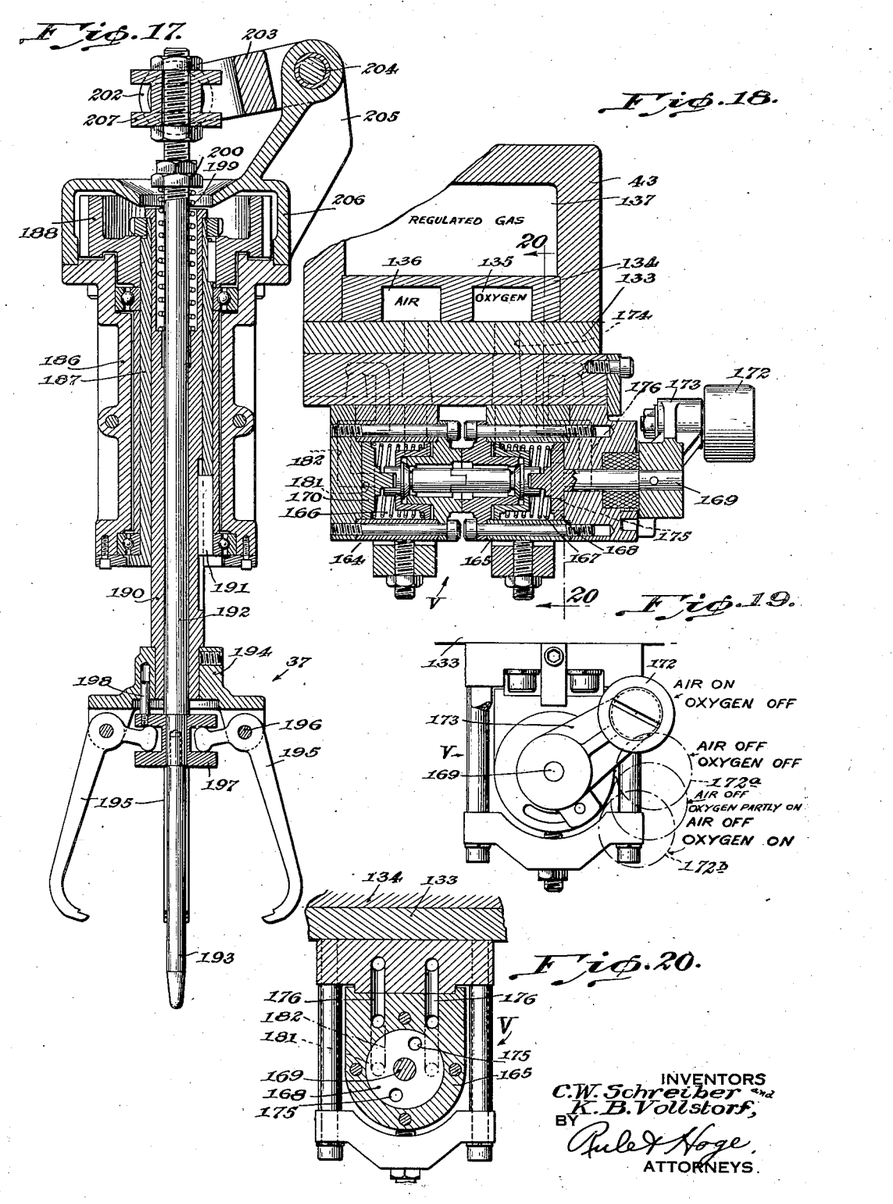
Fig. 17 is an enlarged section at the line 17—17 on Fig. 15 showing a moile gripping unit.
Fig. 18 is a sectional elevation at the line 18—18 on Fig. 13, showing valve mechanism for the compressed air and oxygen lines.
Fig. 19 is an end view of the same.
Fig. 20 is a section at the line 20—20 on Fig. 18.

With the valves in the position shown in Figs. 18, 19 and 20, the oxygen lines are closed by the valve disk 168 and the air lines are open through the ports 181 in the valve disk 170 so that air is supplied to the two burners controlled by this particular valve mechanism. The air is mixed with the fuel gas in the mixers 142. This serves to supply a hot flame in the ring burners during a predetermined time interval as hereinafter set forth. When the valve shaft is rotated to an intermediate position 172$^a$, Fig. 19, the air pressure valves are closed by the valve disk 170. The oxygen lines also remain closed by the disk 168. When the valve shaft is rotated to position 172$^b$ (Fig. 19), the air pressure lines remain closed and valve disk 168 opens the oxygen lines through the ports 175 so that oxygen flows to the mixers 142 where it is mixed with the fuel gas and then passes to the associated burners. While the air and oxygen lines are both cut off, a lazy flame is maintained in the burners by the atmospheric air. The air and oxygen lines are provided with check valves 185 to prevent back flow of the gases.

The article gripping devices 37 and their operating mechanism will now be described. Referring to Figs. 15 and 17, each gripping unit comprises a tubular casing 186 mounted on the carriage and having journalled therein a tubular shaft 187. Keyed to this shaft is a spur gear 188 which runs in mesh with a stationary ring gear 189. A hollow shaft 190 extends through the shaft 187 and is slidable up and down therein. The shafts 187 and 190 have a spline connection 191 so that they rotate as a unit. Extending lengthwise through the shaft 190 is a rod 192. A stem 193 is removably attached to the lower end of the rod 192 and is adapted to enter the neck opening of the workpiece for holding the latter upright during the burn-off operation. The stem is interchangeable with others of different shapes and sizes adapted to the workpieces. Attached to the lower end of the shaft 190 is a head 194 carrying gripping jaws 195 connected thereto by pivots 196. The rod 192 is movable up and down within the shaft 190 for operating the jaws and is operatively connected with the jaws by a flanged collar 197 on the rod. A pin 198 on the collar 197, projects into a bore in the head 194 and connects the rod 192 for rotation with the shaft 190.

The jaws 195 are swung inwardly to article gripping position by a coil spring 199 held under compression between the shaft 190 and a stop nut 200 adjustably mounted on the rod. The jaws are opened by means of a downwardly facing stationary cam track 201 on which runs a cam follower roll 202 on a rock arm 203 connected by a pivot 204 to an arm 205. The arm 205 forms part of a casting 206 which provides a housing for the gear 188. The rock arm 203 is operatively connected to the rod 192 through a connector 207.

Figure 29:
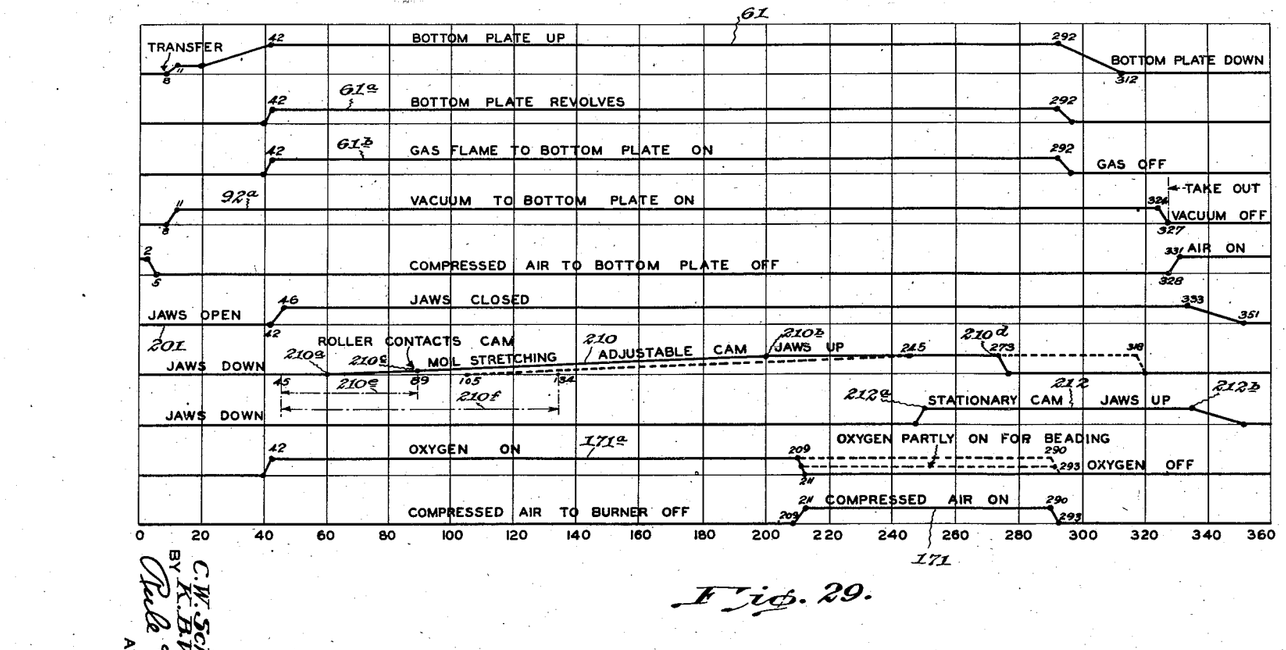
Fig. 29 is a chart showing the timing and sequence of the various operations.

After a workpiece has been lifted to the burn-off position and gripped by the jaws 195, the burner operates to apply localized heat to the rotating workpiece at a predetermined level and for a predetermined time interval. The gripping device is then slowly moved upward as the workpiece continues its travel in a horizontal direction, thereby stretching the moile and thus cooperating with the burner in severing the moile. This upward stretching movement is effected by a moile stretching cam 210 (Figs. 1, 2 and 29) formed on a cam ring 211. The cam face as shown on the chart, Fig. 29, is inclined upwardly from a point 210$^a$ to a point 210$^b$. The cam follower roll 202 after passing from beneath the jaw opening cam 201, permitting the jaws to be closed, travels free of the cams until it contacts the cam 210 at a point 210$^c$. The stretching operation takes place while the roll travels from this point to the point 210$^b$. During this time the moile is severed. The gripping device continues its travel in the lifted position, being held up by the cam 210 until the control is transferred to another cam 212 which is on a level with the high portion of the cam 210 and overlaps the latter as indicated by the chart. The cam 212 extends from the point 212$^a$ to point 212$^b$. The high portion of the cam 210 terminates at the point 210$^d$. The stretching cam 210 is adjustable for adjusting the point at which the stretching commences. Means for effecting this adjustment includes a pinion 213 (Fig. 1) mounted on a shaft 214 and in mesh with rack teeth formed on the cam ring 211. The shaft 214 is rotatable manually as by means of a wrench for adjusting the cam.

When the moile is severed, a bead is formed on the rim of the tumbler or other article owing to the localized heat along the line of severance. By moving the article upwardly a short distance relative to the ring burner after the severance, the size of the bead may be regulated or increased by the continued action of the burner flame. Means for automatically moving the bottom plate 35 upwardly for this purpose is shown in Figs. 4, 5, 6 and 9. Such means includes a vertical rock shaft 215 positioned adjacent the stem 51 and carrying at its upper end a rock arm 216 formed with a stop lug or head 217. The arm 216 is normally held in the full line position shown in Fig. 5 in which the head 217 projects into the path of a roll 218 (Figs. 5 and 9) carried on the arm 65. When the latter is operated by its cam for lifting the workpiece, the roll 218 strikes the stop 217 and thus determines the position of the workpiece for the severing operation. After the moile is severed the rock shaft 215 is rotated to swing the stop 217 to the dotted line position Fig. 5 in which it is inoperative. This movement is effected by a stationary cam 220 (Figs. 4 and 6) which swings a dog 221 fixed to the shaft 215. A coil spring 222 returns the dog and rock shaft to operative position. When the rock arm 216 is swung free of the roll 218, the arm 65 is moved upwardly by the spring 65$^a$ a short distance determined by an adjustable stop 223 in the path of the roll 218. This additional movement lifts the tumbler into position to permit the burner flame to enlarge the bead formed on the rim.

Figures 24, 26:
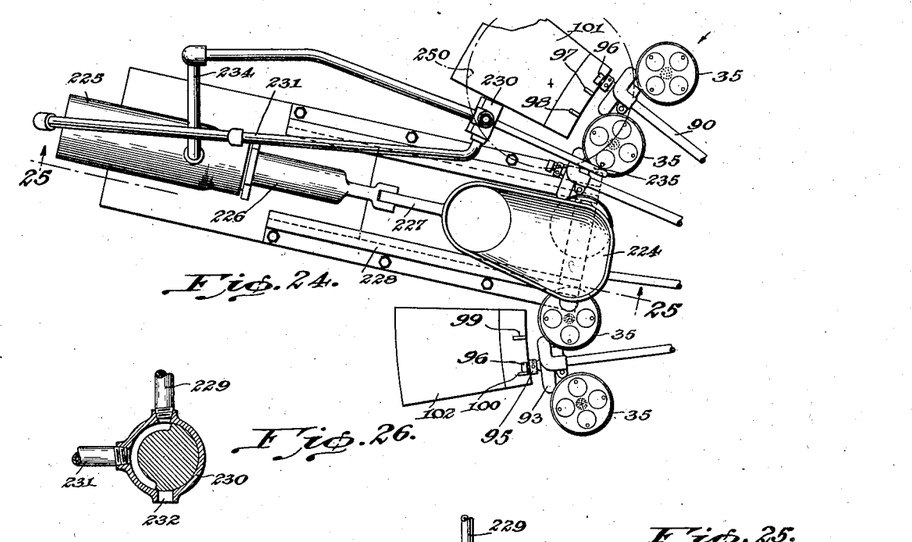
Fig. 24 is a plan view showing the moile discharge chute and safety mechanism for withdrawing it from operative position.
Fig. 26 is a fragmentary sectional view of the safety control valve shown in Fig. 25.
Figure 25:
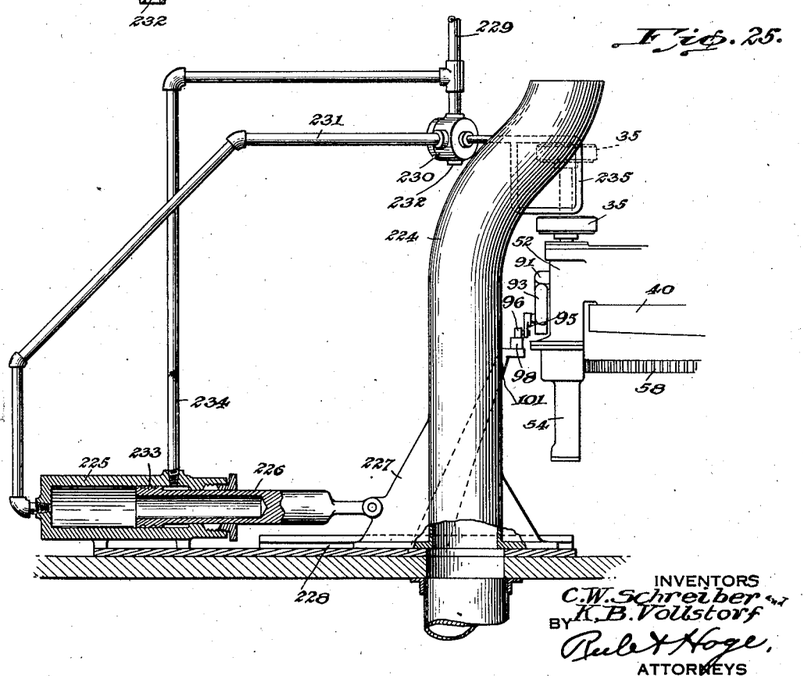
Fig. 25 is a section at the line 25—25 on Fig. 24.

The moile is discharged from the machine through a stationary chute 224, Figs. 24 and 25. The gripping jaws of each unit open when the moile is directly over the chute and drop the moile. As shown in Figs. 24 and 25, the upper end of the chute is directly over the path of the bottom plates 35. Safety means is provided for withdrawing the chute in the event of a bottom plate being held in its lifted position shown in dotted lines Fig. 25, owing to some obstruction or other cause preventing it from being lowered normally. The safety means includes an air operated piston motor comprising a cylinder 225 and piston 226. The piston is connected to the base 227 of the chute 224 which is mounted for sliding movement toward and from the machine in guideways 228.

Air under pressure for moving the chute to operative position is supplied through a pipe 229, valve 230 and a pipe 231. When the valve is reversed, the pipe 229 is cut off and the pipe 231 opened to an exhaust port 232 (Fig. 26). Air pressure is continuously maintained at the inner side of the piston head 233 through a pipe 234 and operates to reverse the motor piston when the valve is actuated, thereby withdrawing the chute.

The means for operating the valve includes an arm 235 connected to the valve and projecting into position to be rocked by the bottom plate 35 when the latter is held above its normal position while approaching the chute.

Figure 27:
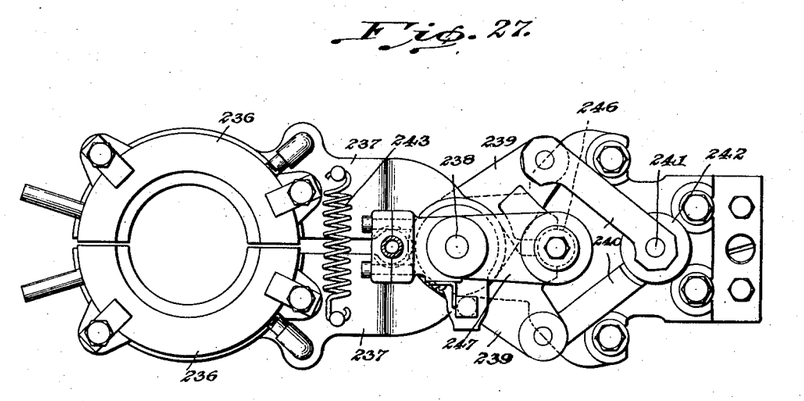
Fig. 27 is a plan view of a modified form of burner comprising partible sections.
Figure 28:
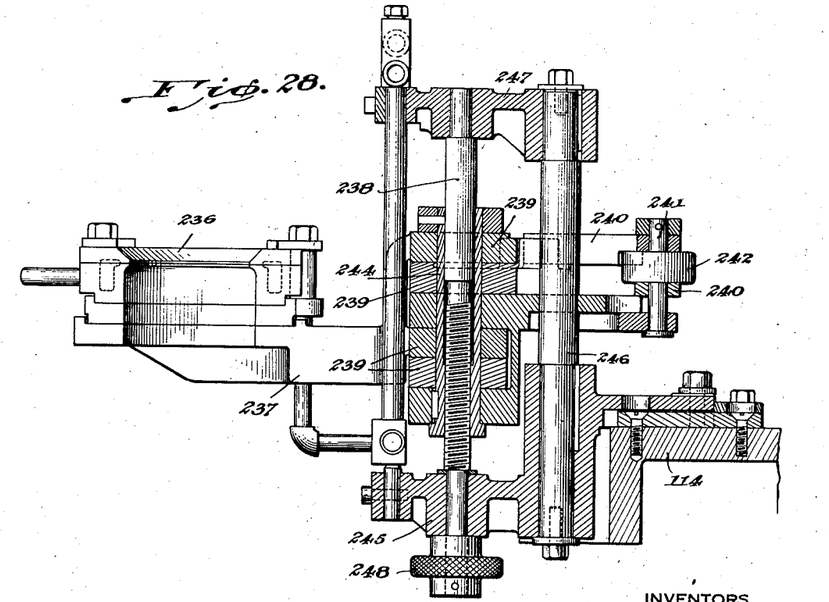
Fig. 28 is a sectional elevation of the same.

Figs. 27 and 28 illustrate a modified form of ring burner which is made in partible sections 236 carried on arms 237 journalled on a pivot shaft 238. The arms are formed with extensions 239 connected through links 240, to a pivot pin 241, on which is mounted a cam follower roll 242. The roll is adapted to run on a stationary cam track for separating the burner sections 236. The sections are closed by a coil spring 243. This construction is specially adapted for use with bottles or other narrow neck ware as the burner sections can be separated to permit the workpiece to be projected upwardly to the burn-off position when the interior diameter of the ring burner is less, for example, than the diameter of the moile. The burner arms 237 are directly mounted on a tubular shaft or bushing 244 which is adjustable up and down on the pivot shaft 238. The latter is journalled in a frame including a bracket 245 mounted on the carriage, a post 246 rising therefrom and a head plate 247 mounted on said post. The pivot shaft 238 has a screw threaded connection with the bushing 244 and is rotatable by means of a knob 248 for adjusting the burner up and down.

The operation of the machine as a whole will now be described, having reference to the chart, Fig. 29, which indicates the relative timing and sequence of operations of a burn-off unit, the cycle of operations being coextensive with a complete rotation of the carriage.

At the commencement of the cycle indicated by the chart, the bottom plate 35 is in its lowered position (Fig. 9) and its driving pinion 57 is rotating idly. The workpiece is placed on the bottom plate either manually or automatically by a transfer device (not shown) shortly after the commencement of the cycle. As indicated on the chart, this transfer commences at about 8 degrees of rotation and is completed at 11 degrees. The valve 92 controlling the application of suction and air pressure through the bottom plate, is moved into position to apply suction substantially simultaneously with the placing of the workpiece on the bottom plate, as indicated by the line 92$^a$, Fig. 29. Shortly after the workpiece is thus placed, the bottom plate is lifted by its cam 61, the lifting movement being completed at about 42 degrees. This connects the clutch members 59, 60 (Fig. 9) and starts the rotation of the bottom plate and workpiece (line 61$^a$, Fig. 29). At the same time the valve 126 (Fig. 9) for the burner 115 is opened as indicated by the line 61$^b$ and directs a heating flame against the bottom plate. Also at this time the cam 201 releases the open gripping jaws permitting them to grip the moile. The cam 171 also at this time (line 171a, Fig. 29) operates the valve (Fig. 18) for supplying oxygen to the ring burner. The burn-off operation is thus initiated.

When the cam roller 202 contacts the stretching cam 210 at the point 210c, the gripping device commences its upward movement, stretching the moile upward until it is severed from the tumbler (or other blown article). The gripping jaws with the severed moile are retained in their lifted position during the fire-finishing operation by which the rim of the tumbler is finished with a bead formed thereon. The cam 171 operates to close the oxygen line about the time the moile has been severed (a closing movement being indicated from 209 to 211 degrees) and at the same time, operates to open the air pressure line to the burner. The intensity of the burner flame is somewhat reduced but is sufficient for forming the bead. The valves now operate (at about 290 degrees) to close both the air and oxygen lines to the burner as the burn-off and fire-finishing operations are now complete. At the same time the cam 61 allows the bottom plate to be lowered so that rotation of the workpiece is discontinued and the valve for the burner 115 is shut off. Shortly after the workpiece has been lowered, the suction to the bottom plate is cut off (at 324 to 327 degrees), and the finished workpiece is immediately removed. This may be done by an automatic take-out device shown diagrammatically at 250, Fig. 24. Air pressure is then turned on through the bottom plate and simultaneously through the blower 105 (Fig. 4) for cleaning off any particles of glass or other foreign material. About this time the gripping jaws are lowered and opened, thus completing the cycle.

As indicated on the cam chart, the stretching cam 210 is adjustable to shift the starting point of the stretching operation, the range of adjustment being indicated by the full and broken line positions. This allows adjustment of the so-called "soaking" time for the preliminary heating at the line of severance before the stretching operation commences. The minimum and maximum soaking times are indicated respectively by the lines 210e and 210f.

It will be understood that the chart is merely illustrative of a practical timing of the operations for a particular kind of ware, but the particular times at which the various operations are commenced and their extent may be varied, in keeping with the size, shape, wall thickness of the blown articles, and other variable factors.

Modifications may be resorted to within the spirit and scope of our invention.

We claim:

1. A machine for severing the moile from blown glass articles, comprising a carriage, means for rotating the carriage about a vertical axis, and a series of burn-off units mounted to rotate with the carriage, each said unit comprising a bottom plate for supporting a workpiece in an upright position, a gripping device spaced above said bottom plate, a ring burner interposed between the bottom plate and said gripping device, a stationary cam track, mechanism on the carriage comprising a cam follower running on said track for lifting the bottom plate and thereby positioning a workpiece thereon for a burn-off operation, a second stationary cam, means on the carriage and operated by said second cam for actuating the gripping device for gripping the moile and holding it during the burn-off operation, said second cam being positioned to effect said actuation of the gripping device while the bottom plate is in said lifted position, automatic mechanism including a stationary cam and means on the carriage actuated thereby for effecting a relative movement of the bottom plate and gripping device away from each other during the burn-off operation for stretching the moile, and automatic means including a stationary cam and mechanism on the carriage actuated thereby for effecting a short relative movement of the bottom plate and burner toward each other, said last mentioned cam being positioned and arranged to effect said relative movement after the moile is severed, to control the formation of a bead on the rim of the article.

2. A machine for severing the moile from blown glass articles, comprising a carriage, means for rotating the carriage about a vertical axis, and a series of burn-off units mounted to rotate with the carriage, each said unit comprising a bottom plate for supporting a workpiece in an upright position, a gripping device spaced above the bottom plate, and a ring burner interposed between the gripping device and a bottom plate, a stationary cam, each said unit comprising means actuated by the cam for lifting the bottom plate with a workpiece supported thereon and positioning the workpiece within the ring burner, a second stationary cam and means actuated thereby for gripping the moiles, and automatic means for intermittently rotating the bottom plates with the workpieces thereon, said last mentioned means comprising a stationary ring gear, pinions individual to said units running in mesh with said gear and automatic means for effecting a driving connection between each said pinion and a said bottom plate when the bottom plate is lifted.

3. A burn-off machine comprising a bottom support for a workpiece, a burner positioned above said support, said support comprising a horizontal bottom plate, centering pins and means for periodically projecting said pins into position to hold a workpiece centered on said plate.

4. A burn-off machine comprising a bottom support for a workpiece, a burner positioned above said support, said support including upper and lower sections relatively movable vertically and centering pins carried on said lower section, the upper section being formed with openings therethrough, said centering pins being movable through said openings, into and out of position to project above the said upper section and hold a workpiece centered thereon.

5. A burn-off machine comprising a bottom support for a workpiece, a burner positioned above said support, said support including upper and lower sections, the lower section comprising a series of members rotatable about vertical axes arranged about the axis of said section, centering pins eccentrically mounted on said rotary members, means for relatively moving said sections for projecting the centering pins to a workpiece holding position, and means for rotating said members for adjusting the centering pins toward and from the center of the said support.

6. A burn-off machine comprising a bottom support for a workpiece, a burner positioned above said support, said support including upper and lower sections relatively movable vertically, gears carried by and symmetrically arranged about the axis of the lower section, workpiece centering pins carried by said gears, and a pinion meshing with said gears, whereby rotation of any said gear effects a rotation of all said gears and thereby moves the centering pins toward or from the center of the said support.

7. Burn-off mechanism comprising in combination a burner, a perforated bottom plate for supporting a workpiece, an air pressure pipe line, a suction pipe line, means for directing and applying air under pressure and suction through said pressure and suction lines respectively to said bottom plate, valve mechanism controlling the supply of air and suction through said lines and including a valve movable into positions for opening said lines alternatively and maintaining each line closed while the other is open and thereby supply air pressure and suction alternatively to said bottom plate, and means for actuating said valve.

8. Burn-off mechanism comprising a bottom plate for supporting a work-piece and having perforations therethrough, a vertical tubular spindle carrying said bottom plate and open to said perforations, a burner, means for supporting the burner over and spaced above said plate, means for moving said spindle and plate up and down, a support in which the spindle is mounted for said movement, a tube mounted in said support and having a telescopic connection with the spindle, means including an air pressure line in communication with said tube and spindle for supplying air under pressure to said tube and spindle and discharging it through said perforations, means including a vacuum line in communication with said tube and spindle for supplying suction through the spindle and said perforations, valve means movable into position for closing the suction line and cutting off the said application of suction during said air pressure supply, said valve means being movable into position for closing the air pressure line and cutting off the said air supply during the application of suction, and valve operating mechanism for moving said valve means into said positions alternatively.

9. Burn-off mechanism comprising a bottom plate for supporting a work-piece and having perforations therethrough, a vertical tubular spindle carrying said bottom plate and open to said perforations, a burner, means for supporting the burner over and spaced above said plate, means for moving said spindle and plate up and down, a support in which the spindle is mounted for said movement, a tube mounted in said support and having a telescopic connection with the spindle, means including an air pressure line in communication with said tube and spindle for supplying air under pressure to said tube and spindle and discharging it through said perforations, means including a vacuum line in communication with said tube and spindle for applying suction through said spindle and perforated bottom plate for holding a work-piece on the bottom plate, a valve movable into position to close the suction line and cut off said application of suction during said air pressure supply, said valve being movable into position to close the air pressure line and cut off the said air supply during the said application of suction, thereby controlling the suction and air pressure supply to the bottom plate, and means for rotating said spindle and bottom plate.

10. Burn-off mechanism comprising, in combination, a bottom plate for supporting a workpiece, a burner spaced above the bottom plate, a vertical spindle carrying the bottom plate, a rock arm operatively connected to the spindle for lifting and lowering said plate to move a workpiece into and out of operative relation to the burner, a second burner positioned and arranged to direct a flame against the bottom plate when the latter is in its lifted position, means providing a gas line leading to said second burner, a valve in said gas line, and means actuated by said rock arm for opening the valve when the bottom plate is lifted.

11. Burn-off mechanism comprising a carriage, means for rotating the carriage about a vertical axis, a burn-off unit on the carriage comprising a vertical spindle at one side of said axis, a bottom plate mounted on the spindle, a ring burner mounted on the carriage concentrically with the spindle and spaced above the bottom plate, a stationary cam, means providing operating connections between the cam and said spindle for lifting and lowering the bottom plate, and automatic means for rotating the spindle and bottom plate about the axis of the spindle when in their lifted position.

12. Burn-off mechanism comprising a carriage, means for rotating the carriage about a vertical axis, a burn-off unit on the carriage comprising a vertical spindle at one side of said axis, a bottom plate mounted on the spindle, a ring burner mounted on the carriage concentrically with the spindle and spaced above the bottom plate, a stationary cam, means providing operating connections between the cam and said spindle for lifting and lowering the bottom plate, and automatic means for rotating the spindle and bottom plate about the axis of the spindle when in their lifted position, said rotating means comprising a pinion journalled on the spindle, a stationary gear in mesh with the said pinion, and clutch members connected respectively to said gear and spindle and connected by the upward movement of the spindle.

13. A machine for severing the moile from blown glass articles, said machine comprising a carriage, means for rotating it about a vertical axis, a multiplicity of burn-off units mounted to rotate with the carriage and arranged in an annular series thereon, each said unit comprising a burner and means for holding a workpiece in operative position relative to the burner, fuel gas lines individual to the burners and supplying fuel gas thereto, air pressure lines individual to the burners for supplying air thereto, gas lines individual to the burners for supplying a second combustion supporting gas to the burners, said carriage comprising an air pressure chamber, a chamber for said second combustion supporting gas, an annular series of valve mechanisms mounted on the carriage, means for distributing gases from said chambers to the valve mechanisms, and means providing gas lines extending from each of said valve mechanisms to a plurality of said burners, each said valve mechanism being operable to control the supply of combustion gases to the associated burners.

14. A machine for severing the moile from blown glass articles, said machine comprising a carriage, means for rotating it about a vertical axis, a multiplicity of burn-off units mounted to rotate with the carriage and arranged in an annular series thereon, each said unit comprising a burner and means for holding a workpiece in operative position relative to the burner, fuel gas lines individual to the burners and supplying fuel gas thereto, air pressure lines individual to the burners for supplying air thereto, gas lines individual to the burners for supplying a second combustion supporting gas to the burners, an annular series of valve mechanisms mounted on the carriage and each controlling the supply of gases to a plurality of the burner units, a stationary cam, and means providing operating connections between the cam and said valve mechanisms for operating the latter and supplying air under pressure and said combustion supporting gas alternatively to the burners.

15. Burn-off apparatus comprising a carriage, means for rotating it about a vertical axis, an annular series of burn-off units mounted on the carriage, each said unit comprising a bottom support for a workpiece, a gripping device spaced above the support for gripping the moile and a burner, a discharge chute through which the severed moiles are discharged, said chute having a stationary mounting and extending beneath the path of the gripping devices, and automatic means for opening the latter for discharging the moiles to the chute.

16. Burn-off apparatus comprising a carriage, means for rotating it about a vertical axis, an annular series of burn-off units mounted on the carriage, each said unit comprising a bottom plate for supporting a workpiece, a spindle carrying said bottom plate, a moile gripping device spaced above the bottom plate, and a burner interposed between the gripping device and the bottom plate for burning off the moile, means for lifting the said spindles in succession for positioning the workpiece for the burn-off operation, a stationary chute having its receiving end positioned beneath the path of said gripping devices, means for operating the latter to release the moiles and drop them into said chute, and safety mechanism for automatically withdrawing said chute upon failure of a said bottom plate to be normally lowered after the moile severing operation.

17. Burn-off apparatus comprising a carriage, means for rotating it about a vertical axis, an annular series of burn-off units mounted on the carriage, each said unit comprising a bottom plate for supporting a workpiece, a spindle carrying said bottom plate, a moile gripping device spaced above the bottom plate, and a burner interposed between the gripping device and the bottom plate for burning off the moile, means for lifting the said spindles in succession for positioning the workpiece for the burn-off operation, a stationary chute having its receiving end positioned beneath the path of said gripping devices, means for operating the latter to release the moiles and drop them into said chute, and safety mechanism for automatically withdrawing said chute upon failure of said bottom plate to be normally lowered after the moile severing operation, said safety mechanism comprising a motor operatively connected to the chute, an air pressure line extending to the motor, a valve in said line, and means connected to the valve and extending into position to be actuated by a said bottom plate which has failed to move downward normally, and thereby actuate the valve and cause the motor to withdraw the chute.

18. A burn-off machine comprising a carriage, means for rotating the carriage, a burn-off unit on the carriage comprising a support for a workpiece, a gripping device for gripping the moile of a workpiece on said support, a ring burner interposed between the said support and gripping device, a stretching cam, and means actuated thereby for moving the gripping device gradually upward in a path predetermined by the contour of the cam during the burn-off operation for stretching the moile.

19. A burn-off machine comprising a carriage, means for rotating the carriage, a burn-off unit on the carriage comprising a support for a workpiece, a gripping device for gripping the moile of a workpiece on said support, a ring burner interposed between the said support and gripping device, a stretching cam, means actuated thereby for moving the gripping device gradually upward during the burn-off operation for stretching the moile, means for adjusting said cam and thereby adjustably varying the point at which during the rotation of the carriage, the stretching operation is commenced; and means comprising a stationary track for maintaining the gripping device in its lifted position independently of the adjustment of said stretching cam.

CARL W. SCHREIBER.
KARL B. VOLLSTORF.

REFERENCES CITED

The following references are of record in the file of this patent:

UNITED STATES PATENTS

| Number | Name | Date |
|---|---|---|
| 610,588 | Schrader | Sept. 13, 1898 |
| 2,215,980 | Schreiber | Sept. 24, 1940 |
| 2,239,627 | Schutz | Apr. 22, 1941 |
| 1,996,814 | Kadow | Apr. 9, 1935 |
| 1,577,536 | Parker et al. | Mar. 23, 1926 |
| 1,757,211 | Parker | May 6, 1930 |
| 1,577,538 | Parker | Mar. 23, 1926 |
| 1,577,655 | Parker | Mar. 23, 1926 |